(12) United States Patent
Lun et al.

(10) Patent No.: US 7,293,633 B2
(45) Date of Patent: Nov. 13, 2007

(54) CONTROLLED DAMPER ASSEMBLY WITH ISOLATED ELECTRICAL CONNECTION

(75) Inventors: Saiman Lun, Centerville, OH (US); Ilya Lisenker, Yellow Springs, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/017,557

(22) Filed: Dec. 20, 2004

(65) Prior Publication Data

US 2005/0284714 A1    Dec. 29, 2005

Related U.S. Application Data

(60) Provisional application No. 60/583,638, filed on Jun. 29, 2004.

(51) Int. Cl.
*F16F 9/53* (2006.01)

(52) U.S. Cl. .................................. 188/267.2

(58) Field of Classification Search ............. 188/267.1, 188/267.2, 269; 439/92
See application file for complete search history.

(56) References Cited

U.S. PATENT DOCUMENTS

| | | | | |
|---|---|---|---|---|
| 3,240,295 A | * | 3/1966 | Martinek et al. ........... 188/267 |
| 4,263,488 A | * | 4/1981 | Freitag et al. ............ 200/52 R |
| 4,265,344 A | * | 5/1981 | Taylor .................... 188/322.17 |
| 4,316,098 A | * | 2/1982 | Freitag et al. .............. 307/119 |
| 4,383,595 A | * | 5/1983 | Schnitzius .................. 188/281 |
| 4,657,228 A | * | 4/1987 | Lautzenhiser ............ 267/64.15 |
| 5,125,338 A | * | 6/1992 | Henson ....................... 101/232 |
| 5,170,866 A | * | 12/1992 | Ghaem .................... 188/267.1 |
| 5,878,851 A | * | 3/1999 | Carlson et al. ............. 188/269 |
| 6,007,345 A | * | 12/1999 | Francis et al. ................ 439/34 |
| 6,260,675 B1 | * | 7/2001 | Muhlenkamp .............. 188/267 |
| 6,270,064 B1 | * | 8/2001 | Tachikawa ............... 267/64.15 |
| 6,345,706 B1 | * | 2/2002 | Oliver et al. ............ 188/282.2 |
| 6,379,162 B1 | * | 4/2002 | Raypole et al. ............... 439/92 |
| 6,390,252 B1 | * | 5/2002 | Namuduri et al. ....... 188/267.2 |
| 6,598,885 B2 | * | 7/2003 | Delorenzis et al. ...... 280/5.507 |

* cited by examiner

*Primary Examiner*—Christopher P. Schwartz
(74) *Attorney, Agent, or Firm*—Scott A. McBain

(57) ABSTRACT

A controlled damper assembly includes a controlled-damper-assembly piston, a controlled-damper-assembly piston rod attached to the piston, an insulated wire, and an electrical connector. The insulated wire is positioned in the piston rod, has a first end operatively connected to the piston, and has a second end. The electrical connector has a first connection terminal electrically connected to the second end of the insulated wire and has a second connection terminal electrically connected to the piston rod. An example, without limitation, of a controlled damper assembly is a magnetorheological damper assembly.

9 Claims, 2 Drawing Sheets

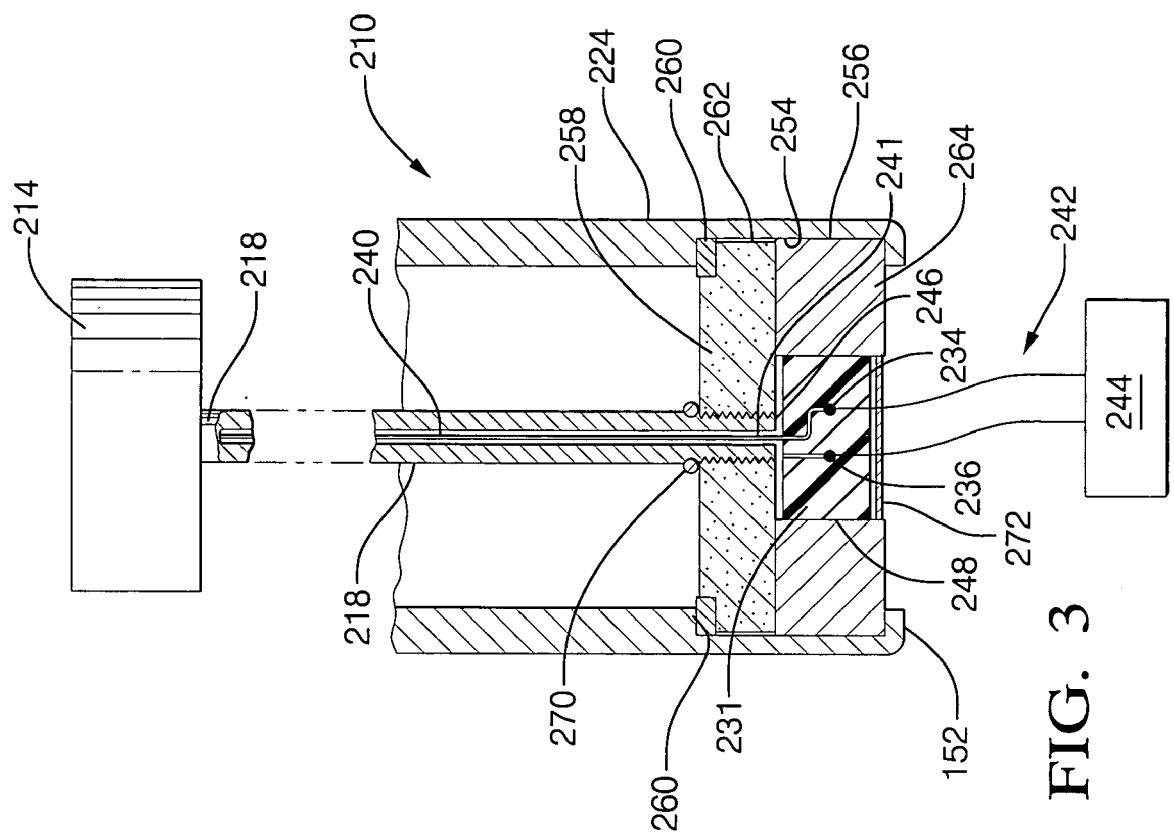
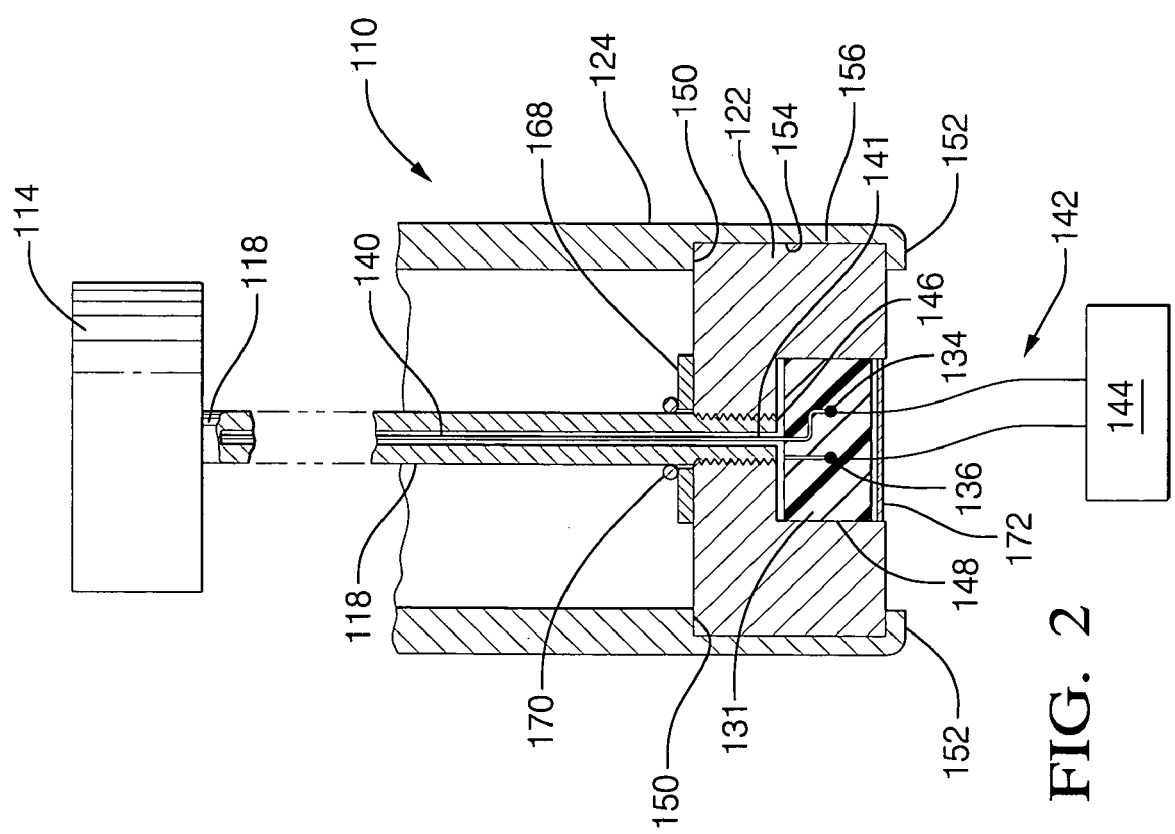
FIG. 3
FIG. 2

CONTROLLED DAMPER ASSEMBLY WITH ISOLATED ELECTRICAL CONNECTION

CROSS REFERENCE TO RELATED APPLICATIONS

The present application claims priority of U.S. Provisional Application No. 60/583,638 filed Jun. 29, 2004.

TECHNICAL FIELD

The present invention is directed generally to a damper assembly, and more particularly to a controlled damper assembly having an electrically isolated connection.

BACKGROUND OF THE INVENTION

One conventional controlled damper assembly includes a piston attached to a hollow piston rod containing two insulated wires. The piston slides within a damper cylinder filled with a damping fluid to dampen motion between a first member attached to the damper cylinder and a second member attached to the rod end which extends from the damper cylinder. One example of a controlled damper assembly is a magnetorheological (MR) damper assembly having a coil (also called an MR coil) in the piston to change the damping characteristics of an MR damping fluid wherein the two insulated wires connect to respective ends of the coil. Another example of a controlled damper assembly is a solenoid-valve damper assembly. The use of two insulated wires creates problems with packaging, cost, and complexity in design and manufacturing process.

Another conventional controlled damper assembly uses one insulated wire connected to one end of the MR coil (or one terminal of the solenoid valve) and has the other end of the coil electrically connected to the piston rod (or the other terminal of the solenoid valve). One side of an electrical connector makes separate connection with the insulated wire and the rod end. The other side of the electrical connector has insulated wire leads connected to a vehicle electronic control unit (ECU). However, in a strut application, the piston rod is electrically connected to the strut housing creating an alternative electrical return path through the vehicle ground. The use of the vehicle ground in providing an electrical return path creates problems with the electronic control unit (ECU). In particular, because other electrical components may also utilize the common secondary path, the vehicle ECU may be unable to independently track the status of the piston and damper assembly of the vehicle. For example, this arrangement prevents the ability to detect the loss of the damper electrical return path to the ECU via the harness electrical connection to the ECU. In addition, if there is a short in the system (i.e. a short from the vehicle battery), the electrical short may travel through the damper assembly and adversely affect its performance.

What is needed is an improved controlled damper assembly.

SUMMARY OF THE INVENTION

A first expression of a first embodiment of the invention is for a controlled damper assembly including a controlled-damper-assembly piston, a controlled-damper-assembly piston rod, an insulated wire, and an electrical connector. The piston rod is attached to the piston. The insulated wire is positioned in the piston rod, has a first end operatively connected to the piston, and has a second end. The electrical connector has a first connection terminal electrically connected to the second end of the insulated wire and has a second connection terminal electrically connected to the piston rod.

A second expression of the first embodiment of the invention is for a controlled damper assembly including a controlled-damper-assembly piston, a controlled-damper-assembly piston rod, an insulated wire, an electrical connector, an insulated strut base, and a cylindrical strut housing. The piston rod is attached to the piston and has a rod end. The insulated wire is positioned in the piston rod, has a first end operatively connected to the piston, and has a second end. The electrical connector has an insulated housing containing a first connection terminal electrically connected to the second end of the insulated wire and containing a second connection terminal electrically connected to the piston rod. The rod end is threadably attached to the strut base. The strut housing circumferentially surrounds, and is attached to, the insulated strut base.

A first expression of another embodiment of the invention is for a controlled damper assembly having a controlled-damper-assembly piston, a controlled-damper-assembly piston rod, an insulated wire, an electrical connector, a conductive insert, a cylindrical strut housing, and an insulated retaining ring. The piston rod is attached to the piston and has a rod end. The insulated wire is positioned in the piston rod, has a first end operatively connected to the piston, and has a second end. The electrical connector has an insulated housing containing a first connection terminal electrically connected to the second end of the insulated wire and containing a second connection terminal electrically connected to the rod end. The rod end is threadably attached to the conductive insert. The cylindrical strut housing circumferentially surrounds the conductive insert and has a circumferential groove, wherein the conductive insert has a circumferential surface portion disposed in the circumferential groove of the strut housing. The insulated retaining ring is positioned radially between and contacting a portion of the conductive insert and a portion of the strut housing preventing radial contact of the conductive insert with the strut housing.

Several benefits and advantages are derived from one or more of the expressions of the embodiments of the invention. In one example, the first and second connection terminals of the electrical connector are operatively connectable by insulated wiring to a vehicle electronic control unit (ECU) with the second connection terminal providing a return electrical ground, to the vehicle ECU, which is isolated from the vehicle ground. The vehicle ECU is able to independently track the status of the damper assembly such as detecting the loss of the damper electrical return path to the vehicle ECU making it possible for the vehicle ECU to limit damper current in the event of a short to the battery on the high side or failure of high current of the driver.

SUMMARY OF THE DRAWINGS

FIG. 2 is a cross-sectional view of a portion of a second embodiment of a controlled damper assembly of the invention; and FIG. 3 is a cross-sectional view of a portion of a third embodiment of a controlled damper assembly of the invention.

DETAILED DESCRIPTION

Figure 1:
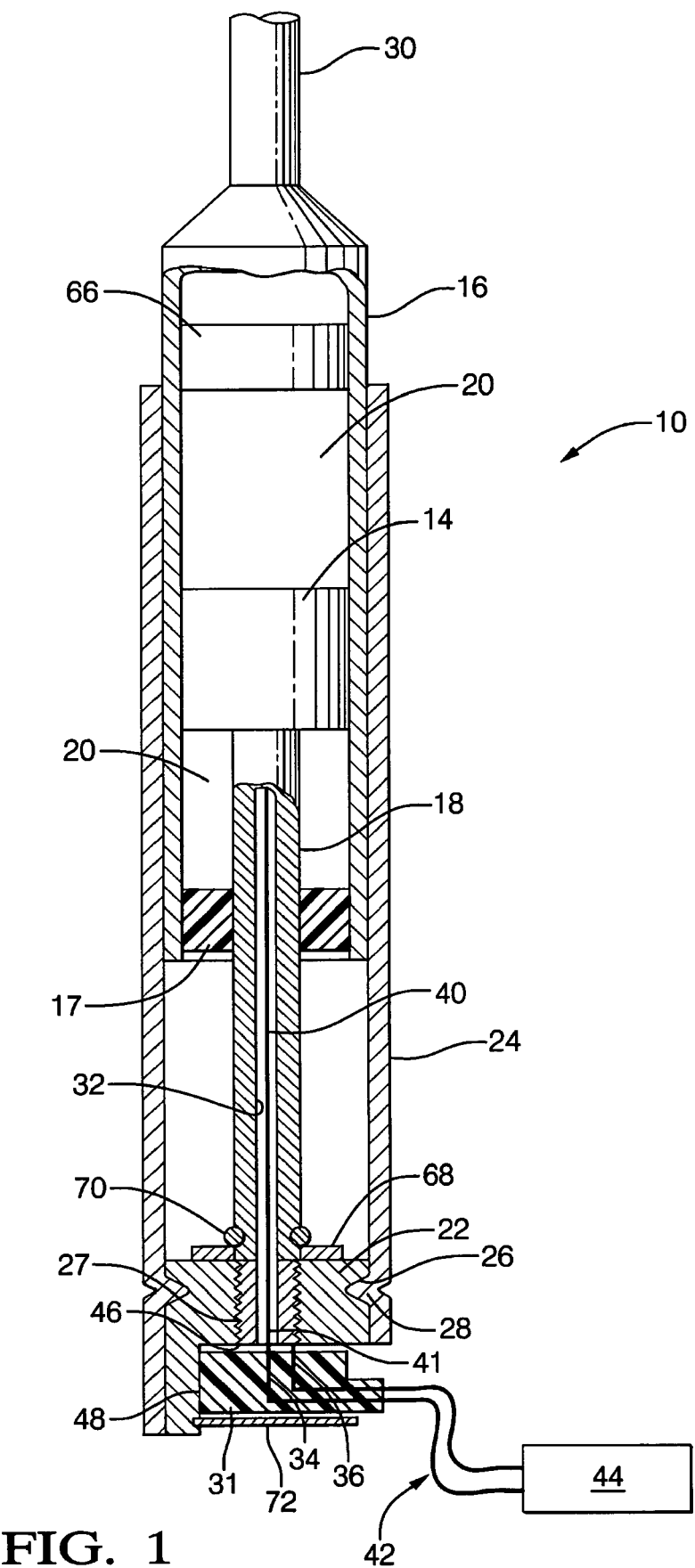
FIG. 1 is a cross-sectional view of a first embodiment of a controlled damper assembly of the invention.

Referring now to the drawings, FIG. 1 shows a first embodiment of a controlled damper assembly 10 of the invention. For purposes of describing the embodiments of the invention, it is noted that the terminology "controlled damper assembly" means "electrically-controlled damper assembly", "insulated" means "electrically insulated", and "conductive" means "electrically conductive". A first expression of the embodiment of FIG. 1 is for a controlled damper assembly 10 including a controlled-damper-assembly piston 14, a controlled-damper-assembly piston rod 18, an insulated wire 40, and an electrical connector 31. The piston rod 18 is attached to the piston 14. The insulated wire 40 is disposed in the piston rod 18, has a first end operatively connected to the piston 14, and has a second end 41. The electrical connector 31 has a first connection terminal 34 electrically connected to the second end 41 of the insulated wire 40 and has a second connection terminal 36 electrically connected to the piston rod 18. The terminology "electrically connected" includes directly electrically connected and indirectly electrically connected.

In one implementation of the first expression of the embodiment of FIG. 1, the controlled damper assembly 10 also includes a cylindrical strut housing 24 circumferentially surrounding the piston rod 18. In one variation of this implementation, the piston rod 18 is electrically isolated from the strut housing 24.

In one application of the first expression of the embodiment of FIG. 1, the first and second connection terminals 34 and 36 of the electrical connector 31 are operatively connectable by insulated wiring 42 to a damper control unit 44. In one variation of this application, the damper control unit 44 is a vehicle electronic control unit (ECU). In one modification, the first connection terminal 34 is a positive connection line, and the second connection terminal 36 is a ground connection line. Examples of connection terminals include male and female connection terminals.

In one example of the first expression of the embodiment of FIG. 1, the piston 14 is a magnetorheological (MR) piston. In another example, not shown, the piston includes at least one solenoid valve controlling the size of a fluid passageway in the piston. In a further example, not shown, the piston includes piezoelectric material controlling the size of a fluid passageway in the piston. Other examples of controlled damper assemblies are left to the artisan.

A second expression of the embodiment of FIG. 1 is for a controlled damper assembly 10 including a controlled-damper-assembly piston 14, a controlled-damper-assembly piston rod 18, an insulated wire 40, an electrical connector 31, an insulated strut base 22, and a cylindrical strut housing 24. The piston rod 18 is attached to the piston 14 and has a rod end 46. The insulated wire 40 is disposed in the piston rod 18, has a first end operatively connected to the piston 14, and has a second end 41. The electrical connector 31 has an insulated housing 48 containing a first connection terminal 34 electrically connected to the second end 41 of the insulated wire 40 and containing a second connection terminal 36 electrically connected to the rod end 46. The rod end 46 is threadably attached to the insulated strut base 22. The strut housing 24 circumferentially surrounds and is attached to the insulated strut base 22.

In one construction of the second expression of the embodiment of FIG. 1, the insulated strut base 22 has a circumferential groove 26, wherein the strut housing 24 has an annular crimp 28 disposed in the circumferential groove 26 of the insulated strut base 22. In one variation, the electrical connector 31 is attached to the insulated strut base 22.

In one application of the second expression of the embodiment of FIG. 1, the first and second connection terminals 34 and 36 of the electrical connector 31 are operatively connectable by insulated wiring 42 to a damper control unit 44. In one variation of this application, the damper control unit 44 is a vehicle electronic control unit (ECU). In one modification, the first connection terminal 34 is a positive connection line, and the second connection terminal 36 is a ground connection line. In one example, the piston 14 is a magnetorheological (MR) piston. Non-vehicle deployments and other vehicle deployments of the controlled damper assembly 10 are left to the artisan.

The following paragraphs present a detailed description of one particular enablement of the embodiment of FIG. 1. It is noted that any feature(s) of this particular enablement can be added to any of the previously-described expressions (including applications, examples, etc. thereof) of the embodiment of FIG. 1.

In this particular enablement of FIG. 1, the damper assembly 10 includes a piston 14 slidably or movably disposed inside a conductive damper cartridge 16. The damper assembly 10 includes a conductive piston rod 18 fixedly coupled to the piston 14 and longitudinally extending outwardly from the damper cartridge 16. A seal cover 17 is coupled to the cartridge 16 and slidably receives the piston rod 18 therethrough. The piston 14 is located in a fluid-filled cavity 20 of the damper cartridge 16 and, in one example, is electrically isolated from the cartridge 16 by insulating seals extending around its periphery. Other examples of electrical isolation are left to the artisan. The lower end of the piston rod 18 is threadably coupled to a generally cylindrical strut base 22, and the strut base 22 is, in turn, fixedly coupled to a generally-cylindrical conductive strut housing 24. The strut housing 24 slidably receives the strut cartridge 16 therein. An upper seal cover 66, a support plate 68, a retainer 70, and a connector cover 72 are also shown in FIG. 1.

The strut base 22 of FIG. 1 is coupled to the strut housing 24 in the following manner. The strut base 22 includes a circumferential crimping groove 26 formed therein. Once the strut base 22 is located inside the strut housing 24, the strut housing 24 is crimped (i.e., deflected), radially inwardly such that the crimped or deflected portion 28 of the strut housing 24 is received in the crimping groove 26 of the strut base 24.

The upper portion 30 of the damper cartridge 16 is fixedly coupled to the body of a vehicle (not shown), and the strut housing 24 is coupled to a vehicle wheel (not shown). When shock or vibrational forces displace the associated vehicle wheel relative to the vehicle body, the force drives the piston 14 within the cavity 20 of the damper cartridge 16 to damp the movement of the wheel in a well-known manner.

Magnetorheological damper assemblies utilize a piston immersed in magnetorheological fluid inside the cavity 20. The piston 14 includes a coil or the like (not shown) located therein such that when a current is passed through the coil the viscosity of the damping fluid can be adjusted to control the damping characteristics of the damping assembly. In one example, the coil is electrically coupled to the piston 14 and piston rod 18.

In order to control the circuit passed through to the piston, an electrical current must be supplied thereto. In addition, other controlled damper assemblies (besides magnetorheological damper assemblies) typically require an electric connection to the piston 14. In order to provide such a connection, the embodiment of FIG. 1 utilizes an insulated strut base 22 to electrically isolate the piston rod 18 from the remaining components of the damper assembly 10. In this manner, the vehicle ECU can be directly electrically connected to the piston rod 18 to provide electrical control and feedback to and from the piston 14.

In one construction, the strut base 22 is a metallic component which is treated with an anodizing process to make it an insulated strut base. The anodizing process provides an insulating metal oxide finish by a well-know electrolytic process to produce a durable satin finish on the strut base 22. All of the exposed surfaces of the strut base 22, including its outer circumferential surface (including the crimping groove 26) and the inner threaded opening 27 are coated with the anodized finish. Other methods of having an insulated strut base, including making the strut base 22 of insulating material, are left to the artisan.

When an anodized coating is used, the anodized coating should be thick enough to provide the desired insulating characteristics, but should be thin enough to ensure good metal-to-metal joining and mechanical performance. In one illustration, the anodized coating has a thickness of between about 10 and about 100 microns, or more particularly between about 40 and about 60 microns, and still more particularly about 50 microns, although anodized coatings of a greater or lesser thickness may also be utilized.

The damper assembly 10 of FIG. 1 includes a connector 31 coupled to the bottom end of the damper assembly 10. The connector 31 includes a positive connection line 34 in electrical connection with an insulated wire 40 located inside the central opening 32 of the piston rod 18 and electrically coupled to the piston/coil 14. The connector 31 also includes a ground connection line 36 contacting, and in electrical connection with, the axial end of the piston rod 18. In this manner, a corresponding female connector (not shown) can be fit about the lower protruding portion of the connector 31 to couple the connector 31 (and both connection lines 34, 36) to the vehicle ECU.

In this manner, a complete, controlled circuit between the vehicle ECU and the coil/piston 14 is provided by the wire 40 and connection lines 34, 36. Because the damper assembly 10 may have intimate electrical connection with the vehicle (i.e., particularly when the damper assembly is a strut), the insulated nature of the strut base 22 serves to isolate the control currents. In particular, current will flow from the connection line 34, to the wire 40 and to the piston 14, through the coil and return to the ECU via the piston rod 18 and ground connecting line 36. In addition, the piston 14 is electrically isolated from the damper cartridge 16 and/or strut housing 12 by the electrically insulating strut base 22. In one example, the strut base 22 provides electrical isolation of up to 500 volts AC, or more. In another example, the strut base 22 provides sufficient electrical isolation up to the voltage of a vehicle battery, such as at least about 14 volts, or at least about 20 volts.

When crimping the strut housing 12 into the crimping groove 26 of the strut base 22, it is possible that the crimping may crack or otherwise compromise the anodizing surface on the strut base 22. In this case, electrical isolation of the piston rod 18 is maintained by having the inner threaded opening 27 of the strut base 22 also be treated with the insulating anodized coating. In one variation, an insulating adhesive plastic resin, such as LOCTITE®, is inserted into the threaded opening 27 of the strut base 22 when the piston rod 18 is threaded thereto to act as a lubricant and an insulating adhesive.

The vehicle ECU can then be electrically coupled to the connector 31 to provide electrical control and feedback to and from the damper assembly 10. In this manner, electrical connections can be made to the single wire 40 inside of the piston rod 18 and to the axial end tip of the piston rod 18.

In one example, the system of the embodiment of FIG. 1 enables the ECU to detect the loss of the damper return to the ECU and allows periodic status checks to ensure that the current path to and from the strut assembly 10 is proper. In addition, the closed circuit path and the electrical connection system of the embodiment of FIG. 1 makes it possible, in one example, for the ECU to limit the current to the damper assembly 10 in event of a short (i.e. an electrical short circuit from the vehicle battery or driver).

Referring again to the drawings, FIG. 2 shows a portion of a second embodiment of a controlled damper assembly 110 of the invention. A first expression of the embodiment of FIG. 2 is for a controlled damper assembly 110 including a controlled-damper-assembly piston 114, a controlled-damper-assembly piston rod 118, an insulated wire 140, an electrical connector 131, an insulated strut base 122, and a cylindrical strut housing 124. The piston rod 118 is attached to the piston 114 and has a rod end 146. The insulated wire 140 is disposed in the piston rod 118, has a first end operatively connected to the piston 114, and has a second end 141. The electrical connector 131 has an insulated housing 148 containing a first connection terminal 134 electrically connected to the second end 141 of the insulated wire 140 and containing a second connection terminal 136 electrically connected to the rod end 146. The rod end 146 is threadably attached to the insulated strut base 122. The strut housing 124 circumferentially surrounds and is attached to the insulated strut base 122.

In one construction of the first expression of the embodiment of FIG. 2, the strut housing 124 has a circumferential groove 154, the insulated strut base 122 has a circumferential surface 156 disposed in the circumferential groove 154 of the strut housing 124. In one variation, the electrical connector 131 is attached to the insulated strut base 122.

In one application of the first expression of the embodiment of FIG. 2, the first and second connection terminals 134 and 136 of the electrical connector 131 are operatively connectable by insulated wiring 142 to a damper control unit 144. In one variation of this application, the damper control unit 144 is a vehicle electronic control unit (ECU). In one modification, the first connection terminal 134 is a positive connection line, and the second connection terminal 136 is a ground connection line. In one example, the piston 114 is a magnetorheological (MR) piston.

The following paragraph presents a detailed description of one particular enablement of the embodiment of FIG. 2. It is noted that any feature(s) of this particular enablement can be added to the previously-described first expression (including applications, examples, etc. thereof) of the embodiment of FIG. 2.

In this particular enablement of FIG. 2, the strut housing 124 includes a lower lip 150, and the strut base 122 is inserted into the strut housing 124 until the strut base 122 engages the lower lip 150. The distal end 152 of the strut housing 124 is then crimped or "rolled" inwardly to trap the strut base 122 therein. It is noted that the lower lip 150 and the distal end 152 longitudinally bound the circumferential groove 154 of the strut housing 124. A support plate 168, a retainer 170, and a connector cover 172 are also shown in FIG. 2.

Referring once more to the drawings, FIG. 3 shows a portion of a third embodiment of a controlled damper assembly 210 of the invention. A first expression of the embodiment of FIG. 3 is for a controlled damper assembly 210 including a controlled-damper-assembly piston 214, a controlled-damper-assembly piston rod 218, an insulated wire 240, an electrical connector 231, a conductive insert 258, a cylindrical strut housing 224, and an insulated retaining ring 260. The piston rod 218 is attached to the piston 214 and has a rod end 246. The insulated wire 240 is disposed in the piston rod 218, has a first end operatively connected to the piston 214, and has a second end 241. The electrical connector 231 has an insulated housing 248 containing a first connection terminal 234 electrically connected to the second end 241 of the insulated wire 240 and containing a second connection terminal 236 electrically connected to the rod end 246. The rod end 248 is threadably attached to the conductive insert 258. The strut housing 224 circumferentially surrounds the conductive insert 258 and has a circumferential groove 254, wherein the conductive insert 258 has a circumferential surface portion 262 disposed in the circumferential groove 254 of the strut housing 224. The insulated retaining ring 260 is disposed radially between and contacting a portion of the conductive insert 258 and a portion of the strut housing 224 preventing radial contact of the conductive insert 258 with the strut housing 224.

In one extension of the first expression of the embodiment of FIG. 3, the controlled damper assembly 210 also includes an insulated annular connector enclosure 264. The insulated annular connector enclosure 264 circumferentially surrounds the electrical connector 231 and has a circumferential surface 256 disposed in the circumferential groove 254 of the strut housing 224. In the circumferential groove 254 of the strut housing 224, the conductive insert 258 is longitudinally disposed between and contacting the insulated retaining ring 260 and the insulated annular connector enclosure 264.

In one application of the first expression of the embodiment of FIG. 3, the first and second connection terminals 234 and 236 of the electrical connector 231 are operatively connectable by insulated wiring 242 to a damper control unit 244. In one variation of this application, the damper control unit 244 is a vehicle electronic control unit (ECU). In one modification, the first connection terminal 234 is a positive connection line, and the second connection terminal 236 is a ground connection line. In one example, the piston 214 is a magnetorheological (MR) piston. In one example, the controlled damper assembly 210 includes a retainer 270 and a connector cover 272 as shown in FIG. 3.

Several benefits and advantages are derived from one or more of the expressions of the embodiments of the invention. In one example, the first and second connection terminals of the electrical connector are operatively connectable by insulated wiring to a vehicle electronic control unit (ECU) with the second connection terminal providing a return electrical ground, to the vehicle ECU, which is isolated from the vehicle ground. The vehicle ECU is able to independently track the status of the damper assembly such as detecting the loss of the damper electrical return path to the vehicle ECU making it possible for the vehicle ECU to limit damper current in the event of a short to the battery on the high side or failure of high current of the driver.

The foregoing description of several expressions of several embodiments of the invention has been presented for purposes of illustration. It is not intended to be exhaustive or to limit the invention to the precise steps or forms disclosed, and obviously many modifications and variations are possible in light of the above teaching. It is intended that the scope of the invention be defined by the claims appended hereto.

The invention claimed is:

1. A controlled damper assembly comprising:
   a) a controlled-damper-assembly magnetorheological piston;
   b) a controlled-damper-assembly piston rod attached to the piston;
   c) an insulated wire disposed in the piston rod, having a first end operatively connected to the piston, and having a second end;
   d) an electrical connector having a first connection terminal electrically connected to the second end of the insulated wire and having a second connection terminal electrically connected to the piston rod, wherein the first and second connection terminals of the electrical connector are operatively connectable by insulated wiring to a vehicle electronic control unit; and
   e) a cylindrical strut housing circumferentially surrounding the piston rod, wherein the piston rod is electrically isolated from the strut housing.

2. The controlled damper assembly of claim 1, wherein the first and second connection terminals of the electrical connector are operatively connected by insulated wiring to the vehicle electronic control unit.

3. A controlled damper assembly comprising:
   a) a controlled-damper-assembly magnetorheological piston;
   b) a controlled-damper-assembly piston rod attached to the piston and having a rod end;
   c) an insulated wire disposed in the piston rod, having a first end operatively connected to the piston, and having a second end;
   d) an electrical connector having an insulated housing containing a first connection terminal electrically connected to the second end of the insulated wire and containing a second connection terminal electrically connected to the rod end, wherein the first and second connection terminals of the electrical connector are operatively connectable by insulated wiring to a vehicle electronic control unit;
   e) an insulated strut base, wherein the rod end is threadably attached to the insulated strut base; and
   f) a cylindrical strut housing circumferentially surrounding and attached to the insulated strut base, wherein the piston rod is electrically isolated from the strut housing.

4. The controlled damper assembly of claim 3, wherein the insulated strut base has a circumferential groove, wherein the strut housing has an annular crimp disposed in the circumferential groove of the insulated strut base, and wherein the electrical connector is attached to the insulated strut base.

5. The controlled damper assembly of claim 3, wherein the strut housing has a circumferential groove, wherein the insulated strut base has a circumferential surface disposed in the circumferential groove of the strut housing, and wherein the electrical connector is attached 6. The controlled damper assembly of claim 3, wherein the first and second connection terminals of the electrical connector are operatively connected by insulated wiring to the vehicle electronic control unit. to the insulated strut base.

7. A controlled damper assembly comprising:
   a) a controlled-damper-assembly magnetorheological piston;
   b) a controlled-damper-assembly piston rod attached to the piston and having a rod end;
   c) an insulated wire disposed in the piston rod, having a first end operatively connected to the piston, and having a second end;
   d) an electrical connector having an insulated housing containing a first connection terminal electrically connected to the second end of the insulated wire and containing a second connection terminal electrically connected to the rod end, wherein the first and second connection terminals of the electrical connector are operatively connectable by insulated wiring to a vehicle electronic control unit;

e) a conductive insert, wherein the rod end is threadably attached to the conductive insert;

f) a cylindrical strut housing circumferentially surrounding the conductive insert and having a circumferential groove wherein the conductive insert has a circumferential surface portion disposed in the circumferential groove of the strut housing; and g) an insulated retaining ring disposed radially between and contacting a portion of the conductive insert and a portion of the strut housing preventing radial contact of the conductive insert with the strut housing, wherein the piston rod is electrically isolated from the strut housing.

8. The controlled damper assembly of claim 7, also including an insulated annular connector enclosure circumferentially surrounding the electrical connector, having a circumferential surface disposed in the circumferential groove of the strut housing, wherein, in the circumferential groove of the strut housing, the conductive insert is longitudinally disposed between and contacting the insulated retaining ring and the insulated annular connector enclosure.

9. The controlled damper assembly of claim 7 wherein the first and second connection terminals of the electrical connector are operatively connected by insulated wiring to the vehicle electronic control unit.

* * * * *